United States Patent Office 2,802,801
Patented Aug. 13, 1957

2,802,801

SOLUTIONS OF VINYLIDENE CHLORIDE TER-POLYMERS IN TETRAHYDROFURAN AND USES THEREOF

Robert J. Reid, Canal Fulton, and Byron H. Werner, Akron, Ohio, assignors to The Firestone Tire & Rubber Company, Akron, Ohio, a corporation of Ohio No Drawing. Application November 23, 1953, Serial No. 393,957

11 Claims. (Cl. 260—30.4)

This invention relates to solutions of terpolymers of vinylidene chloride in tetrahydrofuran and their use, particularly in the preparation of films, filaments and coatings.

The prior art solvents for crystalline vinylidene resins, whether vinylidene chloride or a copolymer of at least 85 percent thereof and up to 15 percent of another monomer, have been found to be disadvantageous from one standpoint or another. For example, hitherto known solvents for such resins have either undesirably high boiling points which makes their removal from the finished article difficult, or the solvents may react with the resin under conditions necessary for preparing solutions. In addition, many of these solvents cannot be obtained commercially and are relatively expensive, and many are toxic. Tetrahydrofuran, which is commercially available at a reasonable price and which has a relatively high vapor pressure, is a solvent for the resins, but solutions of only low solids content are obtainable.

It has been discovered that certain crystalline terpolymers containing vinylidene chloride have sufficient solubility in tetrahydrofuran to yield solutions of such solids content as to make them particularly adapted to spinning, casting and extrusion operations. Solutions of the terpolymer in tetrahydrofuran may be maintained at processing temperatures for long periods of time without any reaction with the terpolymer and without gelation. In addition, such solutions may be allowed to cool to room temperature and be held at this temperature for several hours before crystallization or gelation occurs. Thus application of such solutions is often simplified.

These soluble, crystalline terpolymers are composed of (1) substantially 85 to 90 percent by weight of vinylidene chloride, (2) substantially 5 to 10 percent by weight of vinyl chloride, and (3) substantially 5 to 10 percent by weight of one or more monomers from the class consisting of the methyl and ethyl esters and the nitriles of acrylic and methacrylic acids. The third component of the interpolymer renders it sufficiently soluble in tetrahydrofuran for spinning filaments, extruding and casting films, coating, etc.

The properties of the terpolymer closely approach those of the usual vinylidene resins, the third component having little, if any, noticeable effect on the desirable attributes of film, filament or the like fabricated from the polymer or the copolymer. For instance, the third component has little, if any, effect on the light stability and heat stability of the product. Furthermore, the terpolymer solutions in tetrahydrofuran resemble the hitherto known solutions of vinylidene resins in coming out of solution in crystalline form when extruded or cast or applied as a coating. The film or filament may be spun into a hot-air tower or into water, alcohol, orthophosphoric acid, etc. The stretched filaments and films have high resistance to shrinkage on heating, and in other respects closely resemble the desirable properties of products produced from the hitherto known vinylidene resins.

Two examples follow which are illustrative of methods of preparing the terpolymers.

*Example I*

The following ingredients were charged into a suitable polymerization vessel:

90 parts by weight of vinylidene chloride monomer
5 parts by weight of vinyl chloride monomer
5 parts by weight of acrylonitrile
150 parts by weight of deionized water
0.25 part by weight of tetrasodium pyrophosphate
0.5 part by weight of lauroyl peroxide
0.6 part by weight of gelatin (250 bloom, neutral)

After removal of air from the vessel the above ingredients were heated to 60° C. with vigorous agitation. After 24 hours a yield of 78 percent terpolymer was obtained.

*Example II*

The following ingredients were charged to a polymerizer and subjected to polymerization in the manner of Example I:

85 parts by weight of vinylidene chloride
10 parts by weight of vinyl chloride
5 parts by weight of ethyl acrylate
200 parts by weight of deionized water
0.5 part by weight of lauroyl peroxide
0.08 part by weight of sodium hydroxide
0.5 part by weight of sodium carboxymethyl cellulose After agitating 24 hours at 60° C. a yield of 95 percent terpolymer was obtained.

Modifiers such as dodecyl mercaptan or trichloroethylene and other chain-transfer agents known to the art may be used for regulating the molecular weight in either of the foregoing procedures.

The above terpolymers were washed with two separate portions of 50° deionized water and dried 16 hours at 55° C.

Illustrative of the invention are the terpolymers having the relative percentage compositions indicated in the following table:

| Filament No. | Vinylidene Chloride, Percent By Weight | Vinyl Chloride, Percent by Weight | Third Monomer, Percent by Weight |
|---|---|---|---|
| 1 | 90 | 5 | 5—ethyl acrylate. |
| 2 | 85 | 10 | 5—ethyl acrylate. |
| 3 | 87.5 | 7.5 | 5—acrylonitrile. |
| 4 | 87.5 | 7.5 | 5—methacrylonitrile. |
| 5 | 85 | 5 | 10—methyl methacrylate. |
| 6 | 85 | 7.5 | 7.5—methyl acrylate. |
| 7 | 90 | 5 | 5—ethyl methacrylate. |

The terpolymers may be dissolved in tetrahydrofuran by suspending the terpolymer in the solvent and heating with agitation to a temperature of from about 50° to the boiling point of the solvent, which is about 66° C. at atmospheric pressure. In general, the higher the temperature at which the mixture is maintained the greater the degree of solubility of the terpolymer. Solutions containing at least 35 percent by weight and as much as 50 percent of terpolymer may be easily prepared at the boiling point of tetrahydrofuran. Under these same conditions, however, only 20 to 30 percent solutions of the ordinary crystalline vinylidene chloride-vinyl chloride copolymer may be prepared. Such copolymer solutions are very low in viscosity and extremely difficult and uneconomical to use for the preparation of film, filaments or coatings.

Light stabilizers such as phenyl salicylates or other salicylates, and heat stabilizers such as epoxy compounds may be added to the solutions of the terpolymer prior to further processing. Stable, inert plasticzer may be added. Such solutions can be used for spinning filaments or films either into a hot-air chamber or into a coagulating bath, or they may be used for coating purposes or casting of films either by extrusion into coagulating bath or by casting on to a belt or other suitable surface with evaporation of the solvent under controlled conditions. In any of the evaporative techniques of preparing film, coatings or filaments it is desirable to maintain the temperature of the terpolymer in tetrahydrofuran above the gelation point of the solution.

For film preparation the solution may be extruded through a narrow slit into a coagulating bath or may be cast on to a warm surface, e. g. a surface heated to 40 to 60° C., and the solvent removed by evaporation. Likewise coatings are best prepared by applying the solution to a surface which has been heated.

The coagulation bath, whether for film or filament, may be composed of alcohol, water, solutions of any one of various salts, ortho-phosphoric acid, and other solvents miscible with tetrahydrofuran but non-solvents for the terpolymer. It is often advantageous to heat the coagulating bath, and this temperature should be below that at which the extrusion mass forms bubbles in the coagulant.

The preparation of a filament will be described in connection with ethyl-alcohol coagulation, the apparatus and alcohol both being heated to about 65° C. The copolymer solution was pumped at about room temperature at a rate of 1.2 cc. per minute. After leaving the metering pump it passed through ¾ inch depth of 60-mesh sand, then through ¼ inch depth of 30-mesh sand, through a 400-mesh screen, and then through a 10-hole spinnerette. Each hole of the spinnerette was 0.003 inch in diameter. The spinnerette was submerged in the coagulation bath 2 inches or more. The filament was pulled the length of the coagulation bath (about 4 feet) and wound on a spool at the rate of 35 feet per minute. The wound filament was air dried. It was then oriented by stretching 650 percent of its original length at the temperature of 80° C. while being passed through a slot in a 10-inch long bar, as a continuous operation. The tetrahydrofuran solution contained 50 percent by weight solids and 50 percent by weight tetrahydrofuran, and did not gel or precipitate on standing for several hours at room temperature.

Filament from a 50-percent solution of the terpolymer of Example II in tetrahydrofuran, processed as described, with coagulation in ethyl alcohol, had a good white color and appearance. The 10-denier filaments had a tensile strength of 1.0 gram per denier, and an elongation at break of 17 percent.

The terpolymer filaments may be made of different denier and may be used as monofils or may be twisted with themselves or other fibers to produce strands for weaving or for knitting or the like.

Film is made from solutions of any of the foregoing terpolymers in tetrahydrofuran, heated to around 60° C. and containing substantially 35 or more percent solids content, by extrusion through a slit of about 3 mils width into a coagulating bath. Films may be prepared in this manner of any width and the thickness may be varied by regulating the width of the slit and by varying the speed of withdrawing the film from the coagulant. The films may be given a uni-directional or bi-directional stretch while in the coagulating bath or after removal therefrom. More or less solvent may be included in the film during the stretching operation.

Solutions of the crystalline terpolymers in tetrahydrofuran form desirable coating materials. The coatings may be applied to wood, metals, etc. They are tough, fire resistant, chemically resistant and, suitably stabilized, are weather resistant. The base materials to be coated are preferably preheated to prevent premature crystallization of the interpolymer from the solution.

Removable films may be similarly produced on stationary surfaces or belts using familiar film technique.

The term "terpolymer" is used herein to refer to an interpolymer formed from at least three components. The terpolymer may include, in addition to vinylidene chloride and vinyl chloride, one or more monomers from the class consisting of the methyl and ethyl esters and the nitriles of acrylic and methacrylic acids.

What is claimed is:

1. A solution in a solvent composed essentially of tetrahydrofuran of at least 35 percent by weight of crystalline terpolymer composed of 85 to 90 percent by weight of vinylidene chloride, 5 to 10 percent by weight of vinyl chloride, and 5 to 10 percent by weight of monomer from the class consisting of the methyl and ethyl esters and the nitriles of acrylic and methacrylic acids.

2. A solution in a solvent composed essentially of tetrahydrofuran of at least 35 percent by weight of crystalline terpolymer composed of 90 percent by weight of vinylidene chloride, 5 percent by weight of vinyl chloride, and 5 percent by weight of acrylonitrile.

3. A solution in a solvent composed essentially of tetrahydrofuran of at least 35 percent by weight of crystalline terpolymer composed of 85 percent by weight of vinylidene chloride, 10 percent by weight of vinyl chloride, and 5 percent by weight of ethyl acrylate.

4. In the process of dissolving crystalline terpolymer of substantially 85 to 90 percent by weight of vinylidene chloride, 5 to 10 percent by weight of vinyl chloride and 5 to 10 percent by weight of monomer from the class consisting of the methyl and ethyl esters and the nitriles of acrylic and methacrylic acids, the improvment which consists in using a solvent composed essentially of tetrahydrofuran and dissolving at least 35 parts by weight of the terpolymer in the solvent.

5. In the extrusion of a solution of crystalline terpolymer of substantially 85 to 90 percent vinylidene chloride, 5 to 10 percent of vinyl chloride, and 5 to 10 percent of monomer from the class consisting of the methyl and ethyl esters and the nitriles of acrylic and methacrylic acids, the improvement which consists in using for the solution of the crystalline terpolymer a solvent composed essentially of tetrahydrofuran and using a solution which contains at least 35 per cent by weight of the terpolymer.

6. In the casting of a solution of crystalline terpolymer of substantially 85 to 90 percent vinylidene chloride, 5 to 10 percent of vinyl chloride, and 5 to 10 percent of monomer from the class consisting of the methyl and ethyl esters and the nitriles of acrylic and methacrylic acids, the improvement which consists in using for the solution of the crystalline terpolymer a solvent composed essentially of tetrahydrofuran and using a solution which contains at least 35 percent by weight of the terpolymer.

7. In coating with a solution of crystalline terpolymer of substantially 85 to 90 percent vinylidene chloride, 5 to 10 percent of vinyl chloride, and 5 to 10 percent of monomer from the class consisting of the methyl and ethyl esters and the nitriles of acrylic and methacrylic acids, the improvement which consists in using for the solution of the crystalline terpolymer a solvent composed essentially of tetrahydrofuran and using a solution which contains at least 35 percent by weight of the terpolymer.

8. The process of dissolving in a solvent composed essentially of tetrahydrofuran a crystalline interpolymer containing at least substantially 85 percent by weight of vinylidene chloride and at least substantially 5 percent by weight of vinyl chloride, the improvement which consists in using an interpolymer which contains 5 to 10 percent of monomer from the class consisting of the methyl and ethyl esters and the nitriles of acrylic and methacrylic acids and producing a solution of at least 35 percent by weight of the interpolymer therein.

9. In the process of extruding a solution in a solvent composed essentially of tetrahydrofuran of a crystalline interpolymer containing at least substantially 85 percent by weight of vinylidene chloride and at least substantially 5 percent by weight of vinyl chloride, the improvement which consists in using an interpolymer which contains 5 to 10 percent of monomer from the class consisting of the methyl and ethyl esters and the nitriles of acrylic and methacrylic acids and using a solution of at least 35 percent by weight thereof in a solvent composed essentially of tetrahydrofuran.

10. In the process of casting a solution in a solvent composed essentially of tetrahydrofuran of a crystalline interpolymer containing at least substantially 85 percent by weight of vinylidene chloride and at least substantially 5 percent by weight of vinyl chloride, the improvement which consists in using an interpolymer which contains 5 to 10 percent of monomer from the class consisting of the methyl and ethyl esters and the nitriles of acrylic and methacrylic acids and using a solution of at least 35 percent by weight thereof in a solvent composed essentially of tetrahydrofuran.

11. In the process of coating with a solution in a solvent composed essentially of tetrahydrofuran of a crystalline interpolymer containing at least substantially 85 percent by weight of vinylidene chloride and at least substantially 5 percent by weight of vinyl chloride, the improvement which consists in using an interpolymer which contains 5 to 10 percent of monomer from the class consisting of the methyl and ethyl esters and the nitriles of acrylic and methacrylic acids and using a solution of at least 35 percent by weight thereof in a solvent composed essentially of tetrahydrofuran.

References Cited in the file of this patent
UNITED STATES PATENTS

| | | |
|---|---|---|
| 2,545,317 | Stuchlik | Mar. 13, 1951 |
| 2,636,870 | Connors et al. | Apr. 28, 1953 |
| 2,651,626 | Nie | Sept. 8, 1953 |
| 2,673,191 | Wolf | Mar. 23, 1954 |

OTHER REFERENCES

Chemical and Engineering News, vol. 26, No. 23, June 7, 1948, page 1688.